United States Patent [19]
Gunn et al.

[11] Patent Number: 5,112,153
[45] Date of Patent: May 12, 1992

[54] END CONNECTOR ASSEMBLY WITH BALL HELD CAPTIVE IN SOCKET BEARING AND SHELL HOUSING AND METHOD OF ASSEMBLY

[75] Inventors: Gary R. Gunn, Mullins; Wallace T. Colcord, Marion; Tommy G. Wood, Conway; Gary Weber, Florence; Stan J. Lovendoski, Marion, all of S.C.; James B. Chamberlin, Charlotte, N.C.

[73] Assignee: Maremont Corporation, Carol Stream, Ill.

[21] Appl. No.: 554,295

[22] Filed: Jul. 17, 1990

[51] Int. Cl.⁵ .............................. B25G 3/00
[52] U.S. Cl. .......................... 403/7; 403/77; 403/69
[58] Field of Search .............. 403/71, 69, 70, 76, 403/77, 143, 140, 135, 7; 29/898.044, 898.043, 898.045, 898.046, 898.051

[56] References Cited

U.S. PATENT DOCUMENTS

| | | | |
|---|---|---|---|
| 2,424,455 | 7/1947 | Graham et al. | 403/132 |
| 3,342,513 | 9/1967 | Melton et al. | 403/77 |
| 4,016,950 | 4/1977 | Allison | 29/898.051 X |
| 4,768,895 | 9/1988 | Ludwig et al. | 403/77 |

FOREIGN PATENT DOCUMENTS

| | | | |
|---|---|---|---|
| 112813 | 5/1986 | Japan | 403/132 |
| 1272397 | 4/1982 | United Kingdom | 403/135 |

*Primary Examiner*—Andrew V. Kundrat
*Attorney, Agent, or Firm*—McAndrews, Held & Malloy, Ltd.

[57] ABSTRACT

A captive ball and socket joint where the socket is made from bearing material which is encased in a metal shell, thereby forming a socket around the ball head on the end of a ball stud. The metal shell is cup-shaped and has its base wall apertured so that the ball formed with internal wrenching socket is accessible through the aperture when the ball and the bearing socket are placed into the cup-shaped shell. A flat steel connector lug is pierced with an opening and the wall of the metal cup-shaped shell is secured within the opening by welding. The edge portion of the shell is deformed to render the ball and socket captive in assembly with the lug. The hole in the base wall of the shell permits access for insertion of a rotary drive tool to engage a formation in the ball component to rotate the ball component and secure it to a machine element such as a brace or bracket. The bearing socket can be one or two pieces and can be made from metal bearing material or a plastic bearing material. The method of assembling the joint envisages use of techniques to avoid destruction of the characteristics of the bearing material.

14 Claims, 1 Drawing Sheet

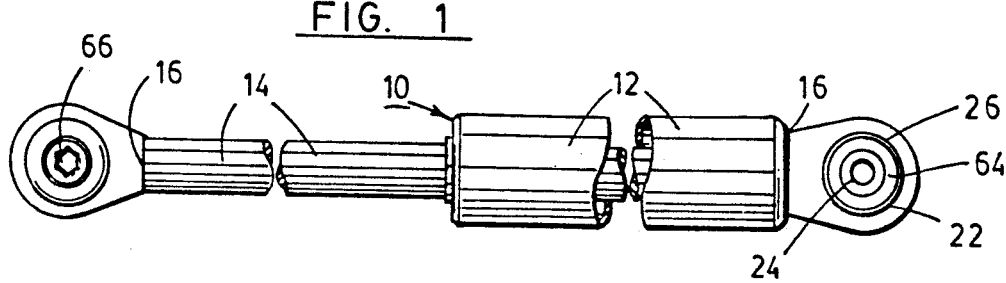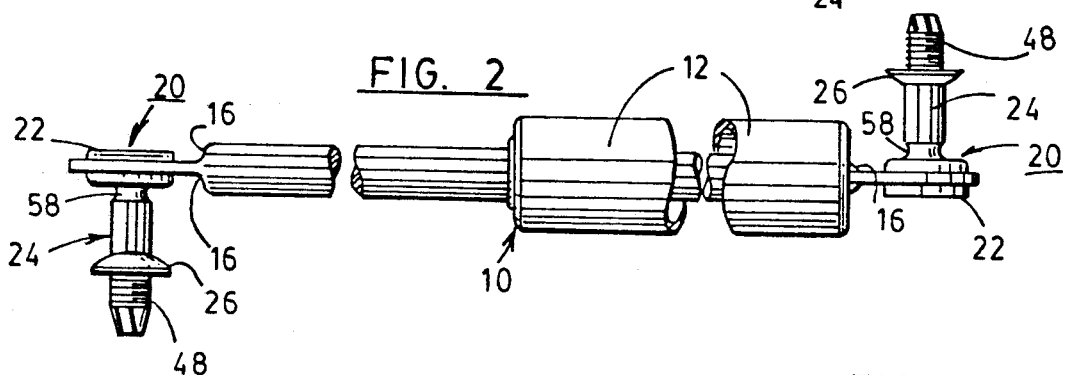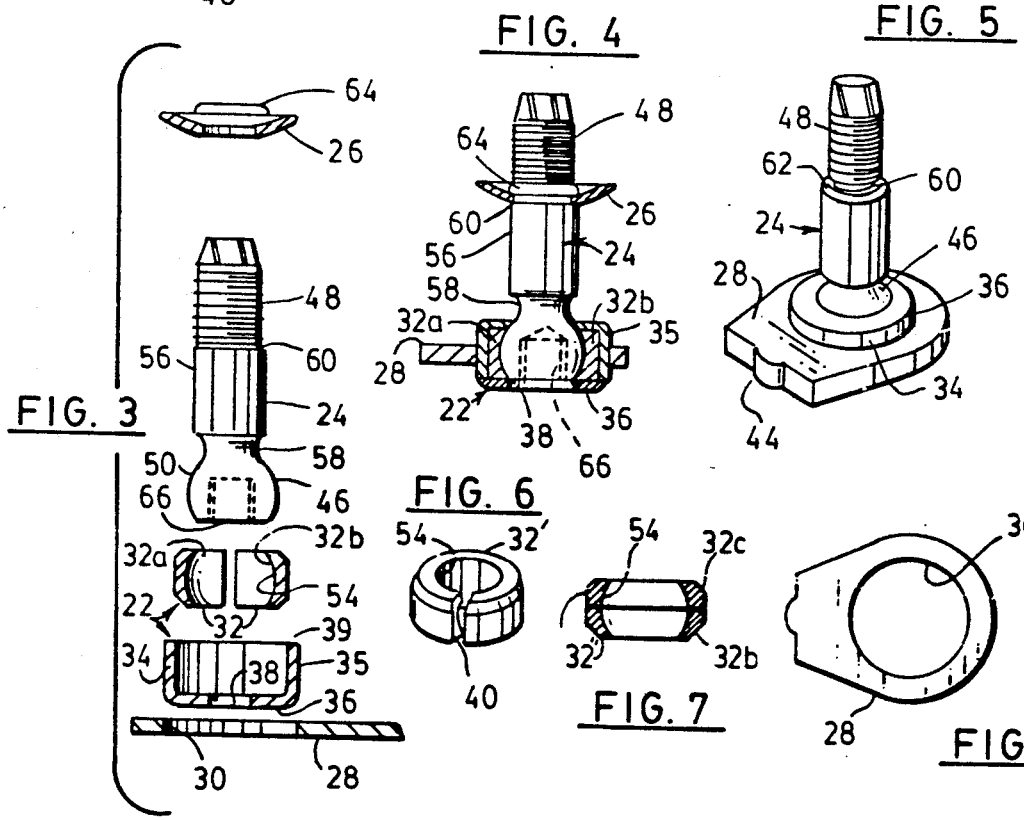

END CONNECTOR ASSEMBLY WITH BALL HELD CAPTIVE IN SOCKET BEARING AND SHELL HOUSING AND METHOD OF ASSEMBLY

BACKGROUND OF THE INVENTION

This invention relates to an improved captive ball and socket joint used to movably connect two machine elements in a universal manner. Various machine elements which can be connected by a ball and socket joint are links, levers and brackets. This invention was developed and will be described in connection with automotive link components, namely counterbalance links such as gas springs, the two ends of which are connected to and provide a linkage between two relatively movable components of an automobile, e.g., the trunk and trunk closure lid. The connection joints are sometimes ordinary pivotal joints but it is becoming more preferable to use ball and socket joints which permit a universally movable pivot connection between the two ends of a gas spring and the automotive elements when the link or gas spring is not mounted for movement in a plane perpendicular to the closure lid hinge center line, thereby necessitating an attachment with omni-directional capability. Components such as gas springs are usually furnished for installation with part of the end connections, usually an apertured lug or a socket, welded or prefastened to the ends of the gas spring. When the spring link is installed, the support part of the end connector is normally fastened to the automobile body or to a bracket on the trunk or hatch lid. When the spring link is installed with sockets to be mated with a ball, some form of clip or separate fastening device is then installed to hold the ball and socket together. It is desirable that the element, e.g., spring link, be preassembled with complete ball and socket end joints, the ball component being held captive in the socket component so they will not become separated when shipped, stored and handled. The worker then merely has to place the ball and stud component in the desired location on the automobile part and secure it in place.

Captive ball and socket joints have been proposed where the ball and the socket are both made from steel and the performance has been satisfactory. But it has become desirable to use a bearing material as apart of the ball and socket joint to avoid noise which can occur when steel moves against steel without lubrication which is often neglected in automotive gas spring end fittings. Such construction with bearing material in the socket has been proposed but the known constructions are not well adapted to mass production and machine controlled assembly.

Various examples of ball and socket joints are seen in the following U.S. patents: U.S. Pat. Nos. 1,759,430 to D. Benjamin and 1,989,116 to J. N. Strauss are examples of split socket bearing members enclosed in a housing and embracing a ball head of a ball unit, and in both patents a separate clip unit holds the bearing pieces in the housing; U.S. Pat. No. 2,855,655 to M. H. Aldredge shows a multi-piece ball and socket joint in which a multi-piece socket cup receives a plural part ball and a half round bearing part and the socket cup to spun over to retain the multi-piece joint as an assembly; U.S. Pat. No. 3,495,858 to G. Kindel shows a multi-layered socket insert, rubber pieces and a metal shell over a ball headed stud, all parts being held in a cup member in which the peripheral edge is swaged over a closure plate to hold all parts in assembly; and U.S. Pat. No. 4,577,989 to E. Ito shows a more sophisticated ball joint somewhat like the Kindel patent teaching. None of the foregoing prior patents teaches access through the socket housing to insert a drive tool to cooperate with a portion of the ball stud. That aspect is however, essentially taught by U.S. Pat. No. 4,768,895 to G. C. Ludwig et al although that patent does not teach the multi-part bearing socket unit within a shell housing. Further, none of the prior patents teaches the combination of a cup-shaped shell with apertured bottom wall enclosing a split socket bearing embracing a ball head of a ball stud and with the periphery of the housing welded or otherwise fixed to an apertured lug to render the ball stud captive within the socket and shell.

SUMMARY OF THE INVENTION

The inventive captive ball and socket joint, including a bearing, is made with a small number of basic components which can be mass produced, and readily assembled with a minimum amount of labor steps, saving time and cost in both production and assembly. Moreover, the assembled ball and bearing containing socket structure is so arranged to permit rapid connection of the ball component to a machine part because of clear and open access through the socket to the ball component to rotate the ball component by a power driven tool, such as a pneumatic, rotary driver. The socket unit consists of a split bearing unit, made from bearing metal such as bronze or plastic, housed in a metal shell, and assembled around the ball. The shell having been joined to an apertured lug is then deformed entrapping the bearing element and the ball head of the ball unit. The ball unit is a single unitary screw the head of which is ball-shaped and includes an integral drive device formed as part of the head. The ball head of the ball unit is embraced by the split socket bearing and together are placed in a subassembly of a cup-shaped metal shell housing and flat apertured metal lug with the threaded shank of the ball unit projected through an open end of the shell. The shell and lug subassembly is formed by locating the shell within the close fitting aperture of the lug, such that the lug is spaced axially from both the open and other end of the cup. The cup and lug are fixed relatively by metallurgical attachment such as welding or brazing, or by application of an adhesive to the interface of the circumferential wall of the cup and aperture of the lug.

The ball stud and socket bearing subassembly having been placed in the cup are retained therein by swagging or otherwise deforming the perimeter edge and adjacent wall portion of the cup radially inwardly over the peripheral outer end portion of the split socket bearing. The circular opening that results from the swagging or deforming of the perimeter edge is sufficiently large to permit swiveling of the ball unit through the desired angle. The shell end wall is apertured to permit access into the drive device socket formed in the ball head of the ball unit.

The shank of the ball unit is stepped to form a shoulder and has an undercut groove between the ball head and the threads. A bellville washer is placed over the threaded end and against the shoulder adjacent the groove to cooperate with a part to which the ball stud is fastened to keep the stud tightly secured thereto by a lock washer effect. The washer is maintained in position on the ball stud by an expandable retaining ring, i.e., a rubber or paper ring which is only necessary to keep the components together until the ball stud is secured in place to a support part, lever, bracket or the like whereafter it is no longer needed but can be left where it was.

The socket lug can be secured by welding, threads or threaded portions or other attachment devices to whatever machine element, e.g., levers, links and other structures, are being assembled with a captive ball and socket end connector joint. The ball unit and its locking concave washer can be assembled to the socket units and the lug before or after the socket lug is secured to its machine element.

The present invention has for a primary object the provision of a novel captive ball and socket joint in which the socket is a composite assembly of a split socket shaped bearing embracing the ball-head of a ball stud, and that assembly being encased in a somewhat cylindrical, cup-shaped metal housing with the stud part of the ball stud projecting through a circular opening formed from a wall portion of the cup-shaped housing. The circumferential wall of the cup-shaped housing is rigidly secured to the apertured surface of a flat plate steel lug prior to assembly with the ball stud and bearing.

Other novel features reside in the provision of split bearing parts which can be split parallel to the bearing axis in one or two parts or normal to the axis into two parts. Also the cup-shaped housing has a cylindrical peripheral wall and an apertured base wall, through which the socket end of the ball stud is accessible. The aperture in the base wall will permit access for a drive tool to be used to engage a drive portion formed in the ball head, to thereby rotatably drive the ball stud to secure it to a link or bracket. Attachment of the cup-shaped housing to the lug can be accomplished by metallurgical attachment such as welding or brazing, or the application of an adhesive at the interface of the two components. A further novel feature resides in the use of a bellville washer on the shank of the ball stud temporarily held in place on the ball stud by an expandable retaining component until such time as the ball stud is fastened to a link.

A further novel aspect of the invention resides in a unique combination of elements in a captive ball and socket joint which enables a novel method of assembly of the elements consisting of a metal shell housing with an apertured base wall, a split bearing socket, a ball stud with a ball head, and an apertured flat steel lug, the method steps being to embrace the ball head with the split bearing, placing the bearing embraced ball into the cup-shaped housing and lug subassembly, with the stud part of the ball stud projecting outwardly opposite the aperture in the base of the cup-shaped shell housing, and then deforming the peripheral edge of the cup-shaped housing over the outwardly facing periphery of the socket bearing thereby retaining the ball head and embracing bearings as a final unitized assembly.

In combination with the foregoing novel provisions and method, the size of the circular opening in the cup-shaped shell relative to the diameter of the ball stud will determine the extent of swiveling or universal joint movement between the ball and the socket of the assembled unit.

Further novel features and other objects of this invention will become apparent from the following detailed description, discussion and the appended claims taken in conjunction with the accompanying drawings.

BRIEF DESCRIPTION OF THE DRAWINGS

Preferred structural embodiments of this invention are disclosed in the accompanying drawings in which:

FIG. 1 is a plan view of a gas spring counterbalance link with a captive ball and socket unit, in accord with the present invention, secured to the shaft end and to the cylinder end of the link as by welding;

FIG. 2 is a side view of the spring link of FIG. 1 and shows a complete captive ball and socket joint, in accord with the present invention, secured on each end of the spring link;

FIG. 3 is an enlarged scale, exploded side view, partially sectioned of the components of one embodiment of a captive ball and two-piece bearing socket joint in accord with this invention;

FIG. 4 is an enlarged scale, side view of the components as shown in FIG. 3 but in assembly with some components shown in section;

FIG. 5 is a perspective view of the assembled unit of FIG. 4, without the washer and clearly showing a small projection on the lug which is used as weld material when welding the lug to either the cylinder or shaft end of the spring link seen in FIG. 1;

FIG. 6 is a detail view showing a one-piece split bearing socket embodiment which can be used with plastic bearing material;

FIG. 7 is a detail view of a two piece split bearing where the split is normal to the axis of the holes in the bearing parts; and FIG. 8 is a plan view of the flat lug piece to which the socket housing will be welded.

GENERAL DESCRIPTION

A preferred complete assembly of the captive ball and socket joint herein described is shown used as the connectors at both ends of a gas spring counterbalance machine element seen in FIGS. 1 and 2, and details of the units of the ball and socket joints are described relative to FIGS. 3-8.

The gas spring link 10, generally depicted in FIGS. 1 and 2, is shown as an example of a machine element to which the ball and socket connector joint can be attached. The gas spring 10 is a link which can be extended and retracted and includes a cylinder 12 and a reciprocable shaft 14. Examples of such gas springs can be seen in U.S. Pat. Nos. 4,451,478 and 4,570,912. FIG. 2 shows two captive ball and socket joints 20, one rigidly mounted on the end of a link cylinder 12 and one mounted on the end of the link shaft 14, as by welding 16, or other suitable means.

The captive ball and socket joint 20 of this invention incudes a composite socket unit 22, a ball stud unit 24 and a bellville washer 26, a conical washer, retained on the ball stud 24. Socket unit 22 consists of several components shown in cross-section in FIG. 4 and exploded view in FIG. 3, and includes the lug 28 which is pierced with a hole 30, the split socket shaped bearing 32 having parts 32a and 32b and the cylindrical cup-shaped housing or shell 34 which receives the split socket bearing 32. The base wall 36 of shell 34 is apertured at 38 to permit access and insertion of a rotary drive tool to engage the "torx" drive recess 66 in the ball head 46. The ball stud 24 with the split socket bearing 32, embracing the ball head 46 of the ball stud 24, is pre-assembled into the shell 34. The bearing 32 can be split in two halves 32a and 32b with the split being diametral through its bearing, i.e , longitudinally parallel to the axis of the bearing 32 or as seen in FIG. 6 the bearing socket 32' can be one piece with a single slot 40 cut in a longitudinal direction. Alternatively the bearing socket can be transversely split into two halves 32c and 32d normal to the longitudinal axis as shown in bearing 32" in FIG. 7. A suitable material for bearings 32 and 32" is metal bearing material such as sintered bronze, whereas the bearing shape 32' with one split piece is the contemplated preferable configuration which can be made from a glass fiber, teflon filled nylon bearing, which, if desired, can also be used as the material for the two piece bearing parts of bearings 32 and 32".

The socket shell 34 can be mass produced by stamping from sheet metal and if desired the stamping operation can simultaneously pierce and cut the hole 38 in the shell base.

The lug 28 can also be mass produced by stamping which can make the lug configured as shown in FIGS. 2, 5, and 8. When the lug 28 is welded to the cylinder 12 or shaft 14, the center of the ball and socket is collinear with the longitudinal axis of the gas spring. The lug thickness is approximately 0.090 mm C.R.S. and the small radiused protrusion 44 is approximately a 0.314 mm. radius and forms the part that is consumed in projection welding of the lug to the cylinder 12 or shaft 14.

Ball stud 24 is a single unitary screw or bolt with a head end, shaped as a truncated portion of a spherical ball 46, and a threaded stud portion 48. Note, as shown in FIGS. 3 and 4, the main portion 50 of the ball head 46 should be spherically contoured to seat in the spherical interior socket surfaces 54 of the split bearings 32, 32' or 32". The threads 48 terminate a spaced distance from the head 46 leaving a cylindrical shank portion 56 which has a larger diameter than the threaded part 48. The shank 56 is undercut at 58 next to the ball head 46 to permit clearance for swivel movement relative to the socket shell. The cylindrical portion 56, as shown in FIG. 3, has an annular groove 60 at the stepped part where the threads 48 begin. The curved, or Bellville, washer 26 fits over the threaded portion 48 to rest against the undercut shoulder 62 of the ball stud shank 56 so the I.D. of washer 26 is adjacent the groove 60. The thickness of washer 26 is slightly less than the width of groove 60 so that when the stud 24 is screwed tightly into matching threads on a support part such as a bracket, the washer will be bowed and its inner perimeter will flex toward and slightly into the groove 60.

To keep the washer 26 retained on the ball stud before the stud is fastened to a link a small expendable rubber, paper or plastic ring or band 64 is placed over the threaded portion 48 of stud 24 and against the washer 26. When the stud is screwed into place and flexes the washer 26 there is no longer any need for the ring or band 64.

METHOD OF ASSEMBLY

With reference to FIGS. 3 and 4, to construct the captive ball and socket joint, shell 34 is positioned so that a major diameter of the ball head portion 50 is within the aperture 30 of lug 28, and, the plane of the flat surface of the lug 28 will be essentially parallel to the base wall 36 of the shell 34. The assembled geometry of the lug 28 and shell 34 is secured by metallurgical attachment such as welding or brazing, or the application of an adhesive at the interface of aperture 30 and shell peripheral wall 35.

The two parts of split bearing socket 32 are placed around the ball head 46 of stud 24 and placed into the shell 34 of the lug and shell subassembly. The split bearing socket encasing the ball is seated into the cup of shell 34.

The wall portion adjacent the peripheral edge 39 shown in FIG. 3 is formed radially inwardly as shown in FIG. 4 capturing the bearing socket 32 and ball head 46 of stud 24.

When the two part split bearing 32" is used, one part 32c is placed over the threaded shank of the ball stud to seat against the underside of the ball and the other part 32d is placed over the ball head to mate with part 32c. Thereafter the ball stud and bearing is placed, as preassembled, in the cup shell 34 and the shell wall portion formed inwardly as previously described, and shown in FIG. 4.

The spherical socket bearing 32' is one piece and is made from plastic so it can be assembled onto the ball head of the stud by simply pressing and snapping the ball end of the stud into the bore of the split bearing ring which being made from plastic has elasticity and can spread apart to receive the ball. Further steps in completing the assembly are as described above.

As is taught in U.S. Pat. No. 4,768,895, the ball stud 24 is made for use in connecting automotive components and may have provision of flutes (not shown) on the end of the threaded shank 48 to provide thread cleaning and chasing of mating female threads in the mounting structure, e.g., an automobile frame or bracket component (not shown).

The ball head 46 is made with a "TORX" drive recess 66, see FIG. 1, which permits screwing of the ball stud by a rotary power driven tool (not shown). Provision for receiving such a tool by the ball head 46 can be other structure, such as screw driver kerfs, polygonal recesses or protrusions as taught in U.S. Pat. No. 4,768,895. In any event, the drive structure on the ball stud head will be completely accessible through the aperture 38 in the base wall 36 of the cup-shaped shell and socket 22.

When the combined ball stud and washer are screwed into an automobile part the bellville washer 26 is forced against and flattened against the automobile part by the shoulder 62 of the ball stud to provide an effective high retention torque force retaining the ball stud to the mounting part.

The previously described joint 20 is adaptable for use in several ways. It can be preassembled as a subassembly, captive ball-in-socket joint consisting of the socket 22 with the lug 28, ball headed stud 24 and a lock washer 26. At anytime, as needed, the subassembly can then be rigidly fastened to a machine element, e.g., bellcrank, spring link, etc., by suitable means such as welding the end of lug 28 to a part of the machine element.

Another way to mount the joint, which in certain assemblies might be preferable, is to first rigidly fasten the lug to the machine element, as by welding and, later on, completing the assembly of the socket shell, socket bearing and ball stud with the bellville washer to render the ball captive in the socket on the lug. The later above-noted procedure is preferable when making an attachment of the connection to the shaft and/or cylinder of a gas spring because the simple relatively flat socket lug can be welded on the gas spring components before they are assembled and will not interfere, the way a ball and socket could, with procedures in automated assembly of the gas spring itself. Furthermore it is possible that where the end of a lever or like is to include the socket part of a captive ball in socket arrangement, the lever or the lever arms of a bellcrank, could be stamped from sheet metal and accordingly the ends of the levers could be stamped and pierced or apertured in the manner described for the sheet metal socket lug so that the socket lug component will be an integral part of a unitary sheet metal lever member.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A ball and socket joint for movably connecting two link components, comprising: a ball subassembly and a socket subassembly which includes a connector means, said two subassemblies being assembled as said joint with said ball subassembly held captive in said socket subassembly; and ball subassembly including an elongate stud means with a ball post and a ball on one end of the post, the major portion of said ball having a spherically contoured surface; said socket subassembly comprising a metal, cup-shaped, bearing housing shell with a peripheral wall having a perimeter edge and an apertured base wall, an annular bearing means contoured to fit within said peripheral wall and having a spherically contoured internal surface matching the spherical contour of said ball and providing a socket encompassing said ball, said ball subassembly with the bearing means encompassing said ball being disposed within said housing shell, with said ball post projected through a centered, circular opening defined by an inwardly deformed wall portion adjacent to the perimeter edge of said cup-shaped shell and with the bearing means and the ball being disposed within the peripheral wall of said shell; a portion of said ball post providing means for connection to a support component, which connection means includes threads on the end part of the ball most opposite said ball, with the portion of said ball post, adjacent to the circular opening, having a diameter less than the diameter of the circular opening so as to enable universal swiveling of said ball stud relative to said socket and with the portion of said ball post between the threaded end part and the ball being a cylindrical shank of less diameter than said ball but greater diameter than said threaded part and with the joinder of said cylindrical shank portion with the threaded end portion is stepped and grooved to provide an annular radial shoulder and an annular groove between said shoulder and the threaded end portion; a bellville washer disposed over said threaded end portion and abutted against said annular radial shoulder and radially aligned with said annular groove, the concavity of said bellville washer facing toward the threaded end of said ball post; a disposable retention means friction fit onto said threaded end portion and against said bellville washer to maintain said bellville washer against said shoulder; said connector means comprising a flat metal link portion with a central aperture having a surface abutting said outer peripheral wall of said bearing shell; and joining means securing said connector means and said shell as a structurally integral unit.

2. A ball and socket joint as defined in claim 1, wherein a portion of said ball on the opposite side of and axially aligned with said elongate stud means includes an integral part enabling rotary drive cooperation with a rotary drive unit and said apertured base wall of said bearing housing portion of said socket subassembly, providing free access to said ball to permit placing of a driving portion of a rotary drive unit into cooperation with said integral part of said ball for turning said elongate stud means and screwing it into a structural linkage component while said ball subassembly is held captive in said socket subassembly.

3. A ball and socket joint as defined in claim 2, wherein said integral part of said ball on the opposite side of and axially aligned with said elongate stud means is a recess in the ball head providing a female wrench socket and the aperture in said base wall of said bearing housing provides access to said ball recess to permit insertion of a male wrench portion of a drive tool into said ball recess for turning said elongate stud means and screwing it into a structural link component while said ball subassembly is held captive in said socket subassembly.

4. A ball and socket joint as defined in claim 1, wherein the joinder of said shank and said ball is made with a concave contoured groove which constitutes the portion of said ball post which is disposed within and adjacent the edge of the circular opening in said shell.

5. A ball and socket joint as defined in claim 1 wherein said peripheral wall of said cup-shaped shell is cylindrical and is contoured with a curve as it passes into said base wall, and the outer surface of said annular bearing means matches and fits with a snug fit into said cylindrical peripheral wall against said base wall.

6. A ball and socket joint as defined in claim 1 wherein said bearing means is split.

7. A ball and socket joint as defined in claim 6, wherein said bearing is one piece with a single slit across one side of the annular bearing means.

8. A ball and socket joint as defined in claim 6, wherein said bearing means is in two symmetrical parts.

9. A ball and socket joint as defined in claim 8, wherein said bearing means is split into two parts along a plane which includes the longitudinal axis of the annular bearing means.

10. A ball and socket joint as defined in claim 8, wherein said bearing means is split into two parts along a plane normal to the longitudinal axis of the annular bearing means and diametrically of the spherical contour.

11. A ball and socket joint as defined in claim 6, wherein the material from which said bearing means is constructed is bearing metal.

12. A ball and socket joint as defined in claim 6, wherein the material from which said bearing means is constructed comprises a plastic.

13. A ball and socket joint as defined in claim 7, wherein the material from which said bearing means is constructed comprises a plastic.

14. An improved captive ball and socket joint assembly used to connect and provide a relatively movable linkage between an end of a gas spring and a mounting for the end of the gas spring, the improved assembly comprising in combination:

(A) a ball sub-assembly including an elongated, generally cylindrical ball post having a ball on one end thereof, a shank portion between the ends thereof, and means on the other end thereof adapted for connecting the ball post to the mounting for the end of the gas spring, with the ball including a preselected, spherically contoured surface that constitutes the major portion of the ball and that terminates, adjacent to the one end, in a generally circular plane which is transverse to the longitudinal axis of the ball post, which has a preselected diameter substantially equal to the diameter of the shank portion and which includes a recess adapted to receive a rotary tool;

(B) a socket sub-assembly including an annular, split ring bearing that includes a first opening and a second, circular opening which is adjacent to the circular plane and whose diameter is substantially equal to the diameter of the circular plane, with the split ring bearing having a generally spherically contoured internal surface that matches the spherical contoured surface of the ball and that provides a socket for receiving and encompassing the ball; and a bearing housing shell having a bottom wall and a side wall that has a preselected outer shape and size, that extends from the bottom wall so as to define a cup shaped interior and that terminates in a peripheral edge, with the split ring bearing being deposed within the interior of the housing shell and being held tightly therein by the peripheral edge of the side wall, with the peripheral edge defining a third opening which is co-axial with the first opening of the split ring bearing, through which the shank portion of the ball post projects, and which has a diameter substantially equal to the diameter of the first opening of the split ring bearing and less than the diameter of the shank portion of the ball post, and with the bottom wall of the housing shell having a fourth opening that has a diameter substantially equal to the diameter of the circular plane, that is co-axial with the second opening in the split ring bearing and that is adapted to permit the passage of a rotary tool adapted for engaging the recess in the circular plane of the ball and for rotating the ball post about its longitudinal axis and relative to the socket sub-assembly;

(C) a flat metal plate including a first surface and having an aperture therein, with the aperture having a shape that is congruent to the outer shape of the side wall of the housing shell and a size that is substantially equal to the size of the housing shell so that the housing shell fits within the aperture and so that the fourth opening is uncovered by the metal plate and is accessible, and with the first surface being adapted to be disposed in surface to surface contact with the end of the gas spring; and means for securing the housing shell within the aperture in the metal plate.

* * * * *